Aug. 31, 1943.　　　C. W. OSBORNE　　　2,328,291
AUTOMATIC TRANSMISSION
Filed July 19, 1941　　　5 Sheets-Sheet 3

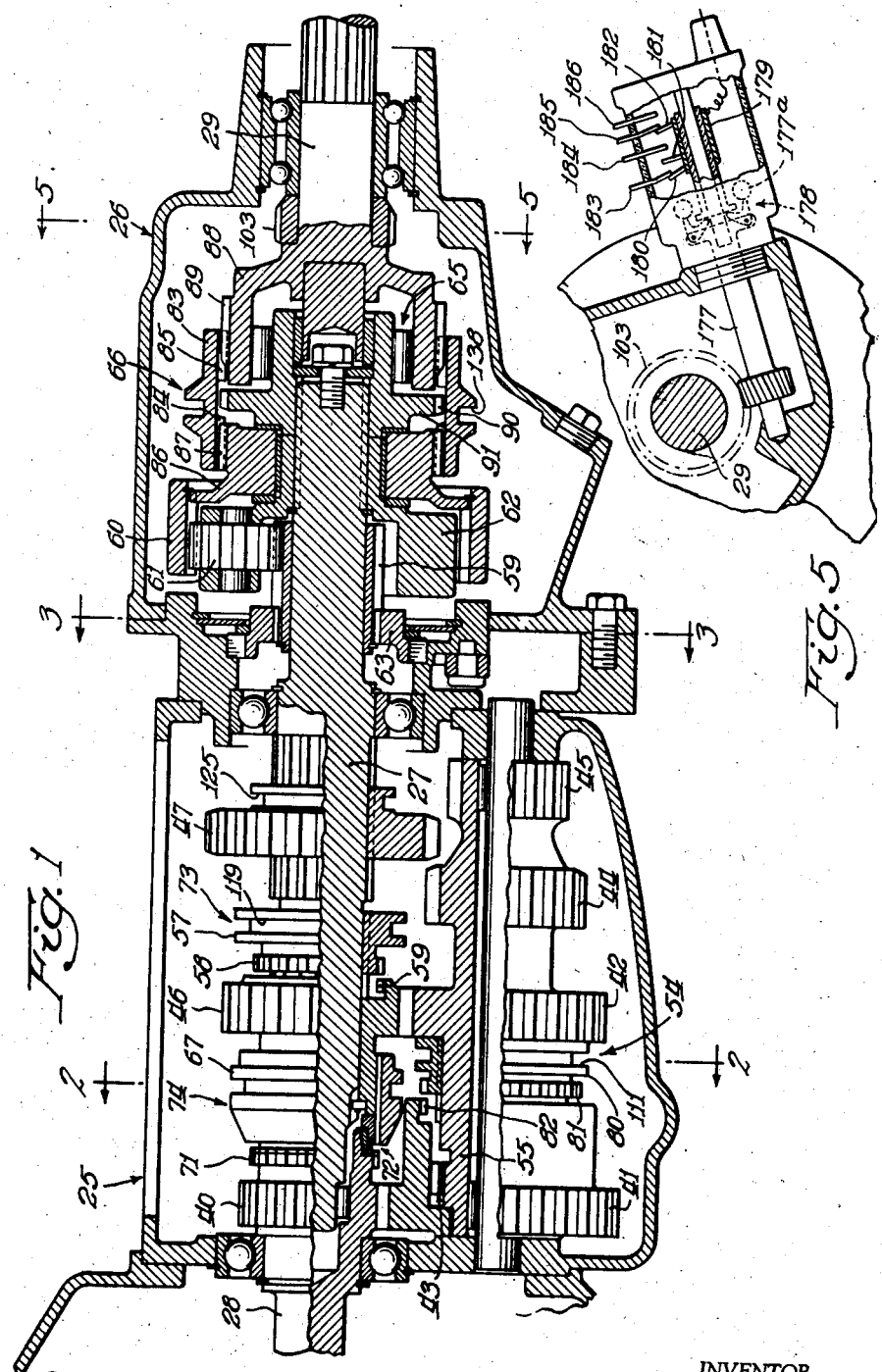

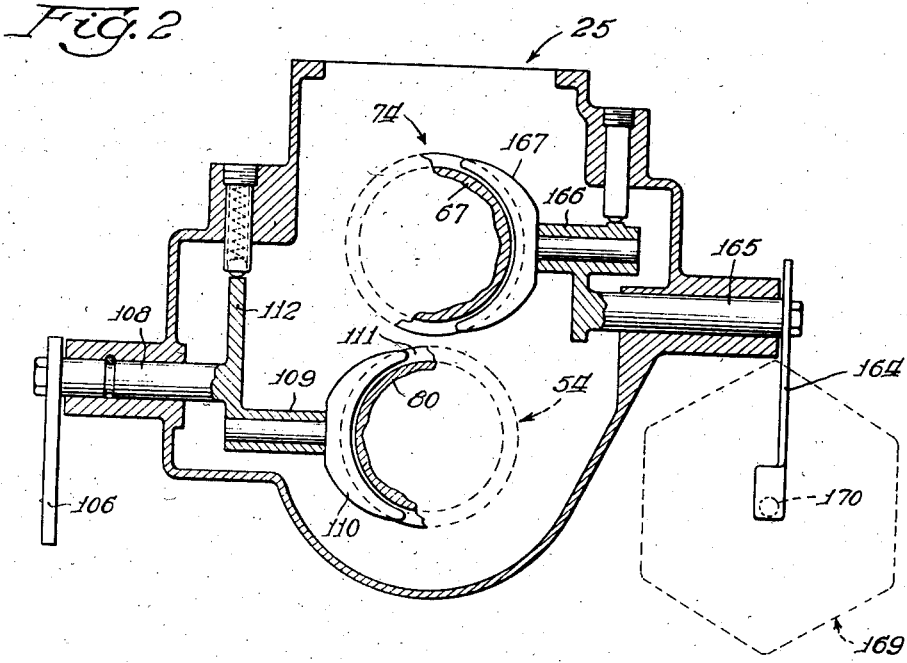
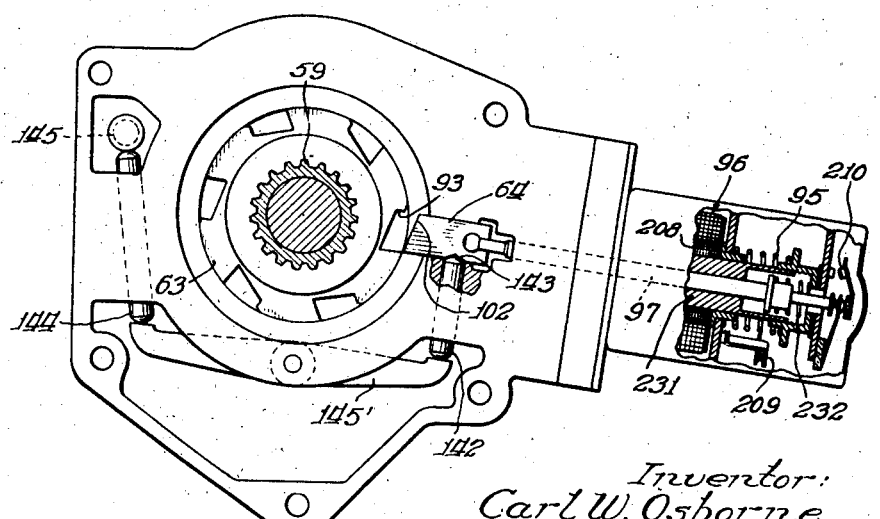

Inventor:
Carl W. Osborne
By: Edward C. Gritzbaugh
Atty.

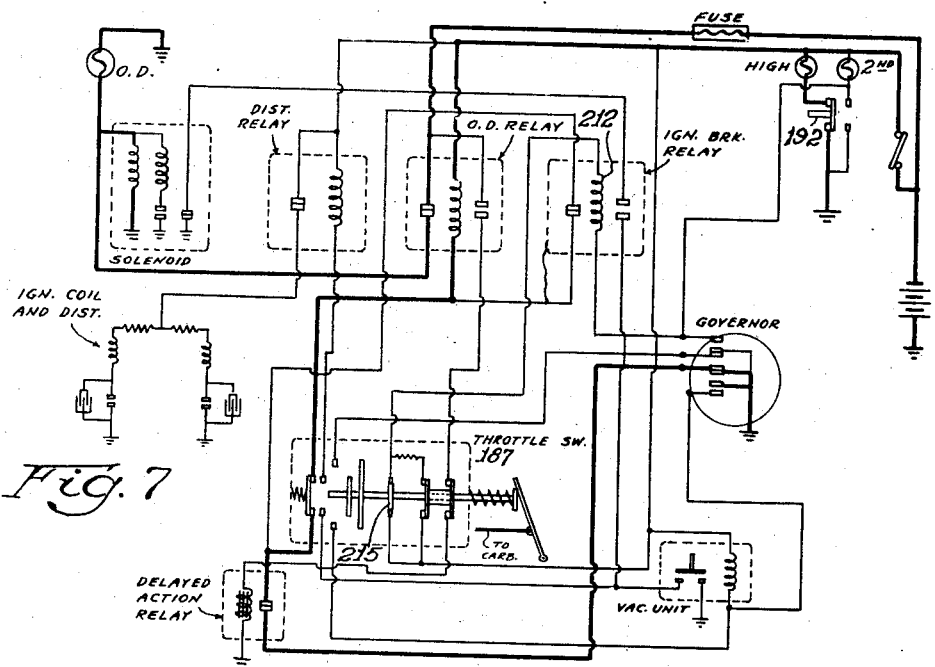

Patented Aug. 31, 1943

2,328,291

UNITED STATES PATENT OFFICE 2,328,291

AUTOMATIC TRANSMISSION

Carl W. Osborne, Muncie, Ind., assignor to Borg-Warner Corporation, Chicago, Ill., a corporation of Illinois Application July 19, 1941, Serial No. 403,198

13 Claims. (Cl. 74—328)

This invention relates to automatic transmissions for automotive vehicles and particularly to a control system therefor. For convenience it will be described with reference to a two-unit type of transmission comprising a countershaft unit and a planetary overdrive unit in tandem such as is described in a copending application of J. M. Simpson and H. E. Carnagua Serial No. 403,196, filed July 19, 1941.

It has been proposed to combine a countershaft type of transmission unit with an overdrive unit in such a manner as to obtain first, second, direct, overdrive second and overdrive direct speed ratios through the combined units. It has also been proposed in connection with such a transmission to so space the ratios numerically that direct drive will be substantially half way between overdrive and overdrive second speed ratio and that second speed will bear the usual relation numerically to direct drive. In a transmission so designed, it is desirable when downshifting to shift successively from overdrive direct to overdrive second to second speed in order to make available increasingly higher ratios which are so spaced as to provide optimum performance.

An object of this invention is to provide a control system for a two-unit transmission of the type described which will render possible successive downshifts from overdrive direct to overdrive second to second speed.

Another object of this invention is to provide a transmission which is shiftable upward automatically from second to overdrive second to overdrive direct and downshifted from overdrive direct to direct above predetermined speeds of the vehicle only and shiftable downward in a lower speed range from overdrive direct to overdrive second instead of direct.

Another object of this invention is a control system for a transmission having a plurality of shiftable elements with electrical means associated with one of the elements for preventing a downshift in another element until the first element has been downshifted.

These and other objects and features of this invention will become apparent from the following detailed description and the accompanying drawings in which:

Fig. 1 is an elevation in section of a transmission embodying this invention;

Fig. 2 is a cross section through the transmission taken along lines 2—2 of Fig. 1;

Fig. 3 is a cross section taken through the overdrive unit at 3—3 showing one of the automatic controls;

Fig. 5 is a schematic diagram of the governor switch; and

Figs. 6 to 10 are wiring diagrams showing the circuits which are established under various operating conditions.

The transmission mechanism

Figure 4:
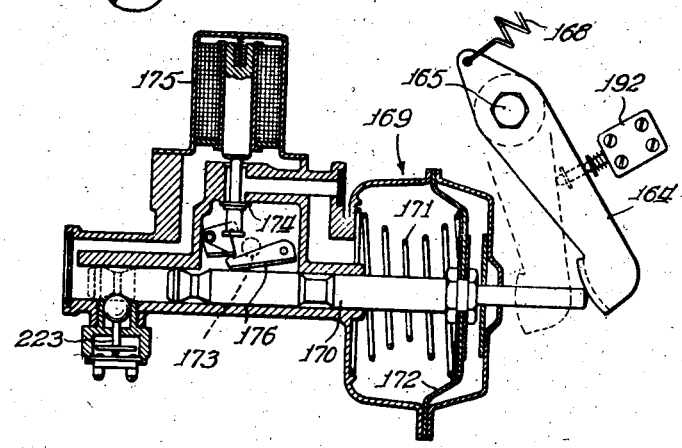
Fig. 4 is a section in elevation of another automatic control.

Referring now to Fig. 1 for a general description of the mechanical features, the transmission is comprised of a first unit 25 of the countershaft type, a second unit 26 of the planetary type which is connected to the first unit through an intermediate shaft 27; an input shaft 28 and an output shaft 29.

The first unit 25 is comprised of an input gear 40 directly connected to input shaft 28, a gear 41 mounted on a countershaft 55 and in mesh with input gear 40, a second countershaft gear 42 which is driven from gear 41 through an overrunning clutch 43, two progressively smaller countershaft gears 44 and 45, a gear 46 loosely mounted on intermediate shaft 27 and a gear 47 slidably mounted on said intermediate shaft 27. Gear 47 may be slid to the right (Fig. 1) by suitably engaging a groove 125 therein to engage an idler gear (not shown) which meshes with gear 45 on the countershaft to produce a reverse drive in intermediate shaft 27. When gear 47 is slid to the left (Fig. 1) it engages gear 44 on the countershaft to produce a low speed forward drive in intermediate shaft 27. A position of gear 47 intermediate gears 44 and 45 disconnects shaft 27 from the remainder of the transmission to produce neutral.

A jaw clutch 73 provides a means for connecting loose gear 46 to intermediate shaft 27, another jaw clutch 74 is used to connect loose gear 46 to input gear 40 and a third jaw clutch 54 serves to lock up overrunning clutch 43. Jaw clutch 73 is comprised of a collar 57 slidably splined to shaft 27 and having external teeth 58 engageable with internal teeth 59 on gear 46. Collar 57 is controlled by suitable shift means (not shown) engaging a groove 119 therein. Jaw clutch 74 is comprised of a toothed sleeve 67 which is engageable with teeth 71 on input gear 40. A blocker 72 prevents the engagement of teeth 71 by sleeve 67 until a reversal of torque takes place between gears 40 and 46. Jaw clutch 54 is comprised of a slidable collar 80 splined to countershaft 55 and having teeth 81 engageable with teeth 82 on gear 41. Collar 80 is provided with a groove 111 by which its position may be controlled from an external source.

The second unit 26 is comprised of a sun gear 59, a ring gear 60, and a plurality of planet pinions 61 meshing with sun gear 59 and ring gear 60. Planet pinions 61 are mounted on a carrier 62 which is rotatable with intermediate shaft 27. Sun gear 59 is connected to, and rotatable with, a slotted member 63 which may be held against rotation by a radially slidable pawl 64, the pawl being rotationally fixed with respect to the slotted member 63. Intermediate shaft 27 may be directly connected to output shaft 29 through an overrunning clutch 65. Ring gear 60 is connected to output shaft 29 to provide an overdrive, the connection being effected through a jaw clutch 66. In order to prevent free wheeling between intermediate shaft 27 and output shaft 29, as for example, in reverse drive, or when the engine is to be used as a brake, it is desirable to lock up free wheeling clutch 65. This is accomplished through a second position of clutch 66 by instrumentalities to be described later.

The gear trains which may be established through the transmission are as follows:

Neutral, low and reverse are obtained by properly positioning gear 47 as described above. In reverse, gear 47 is moved to the right (Fig. 1) and the drive is from gear 40 to gear 41, overrunning clutch 43, countershaft 55, gear 45, the reverse idler, gear 47, intermediate shaft 27, clutch 66 (reverse position) to output shaft 29. In low speed, gear 47 is moved to the left (Fig. 1) and the drive is from gear 40 as before through gear 41, overrunning clutch 43, countershaft 55, gear 44, gear 47, intermediate shaft 27 through overrunning clutch 65 (or lock-up position of clutch 66) to output shaft 29.

For second speed, gear 47, is moved to its neutral position and jaw clutch 73 is engaged with gear 46. The drive is then from gear 40 through gear 41, overrunning clutch 43, gear 42, gear 46, clutch 73 to intermediate shaft 27. If pawl 64 of the planetary unit 26 is disengaged from slotted reaction member 63 as shown in Fig. 3, intermediate shaft 27 is directly connected with output shaft 29 either through jaw clutch 66 or overrunning clutch 65 and the second speed is solely effective.

For direct drive, clutch 73 remains engaged and clutch 74 is moved to engage gear 40. The drive is then from gear 40 through clutch 74, gear 46, through clutch 73 to intermediate shaft 27, and, as in the case of second speed, if pawl 64 is disengaged from slotted member 63, a direct drive will be effected to output shaft 29 either through jaw clutch 66 or overrunning clutch 65.

The ratios establishable through planetary unit 26 are direct drive and overdrive, direct drive being obtained as above. When pawl 64 is engaged with slotted member 63, a reaction will be provided for sun gear 59 and an overdrive ratio will then be effected through planet pinions 61 and ring gear 60. If overdrive is established in unit 26 when second speed is effective in unit 25, an overdrive second speed will be established through the transmission as a whole. Similarly, if overdrive is made effective in unit 26 when unit 25 is conditioned for direct drive operation, the overall ratio will be an overdrive direct.

Thus the ratios establishable between input shaft 28 and output shaft 29 are reverse, low, second, overdrive second, direct and overdrive direct; reverse, low, second and direct being obtained when the planetary is operated in direct drive and in effect acts as a continuation of output shaft 29.

The details of the overdrive unit are shown in Figs. 1 and 3. Referring now to these two figures, clutch 66 is comprised of a slidable sleeve 83 having two sets of internal teeth 84 and 85 and a peripheral groove 138 by which its position may be controlled by an external shifting device (not shown). Ring gear 60 is rotatable with a support 86 which is provided with external teeth 87 engageable with internal teeth 84 of sleeve 83. Output shaft 29 is provided with an enlarged inner portion 88 having external teeth 89 engageable with internal teeth 85. Thus when clutch 66 is in the position shown, a direct connection is effective between ring gear 60 and output shaft 29.

In the space between internal teeth 84 and 85 are located external teeth 90 formed on the periphery of a hub member 91 which is splined to, and rotatable with, intermediate shaft 27. When sleeve 83 is moved to the right (Fig. 1) so as to engage teeth 84 with teeth 90, teeth 85 remaining engaged with teeth 89 on output shaft 29, a direct two-way connection is established between intermediate shaft 27 and output shaft 29 thereby locking up overrunning clutch 65. When such two-way connection is effective, the planetary gears are rotated as a unit and overdrive is impossible.

The means for effectuating overdrive is shown more clearly in Fig. 3. It is comprised of a disc 63 which is rotatable with the sun gear 59, the disc being provided with a plurality of radially extending slots 93. The radially movable pawl 64, which is rotationally fixed with respect to sun gear 59 is adapted to engage one of the slots 93 of disc 63 to arrest the rotation of said disc and thereby supply a fixed reaction for sun gear 59. The radial movement of pawl 64 is effected in an outward direction by means of a spring 95, and in a radially inward direction by an automatically controlled device 96 and a rod 97 serving to connect the pawl 64 with a spring and automatic device 96.

In order to assist pawl 64 in engaging a slot 93, the end 102 of the pawl is chamfered as shown on Fig. 3. The direction of the chamfer is opposite to that normally used in planetary overdrives of this type since the pawl is not dependent upon torque reversal under ordinary circumstances for its engagement.

A speedometer drive gear 103 (Fig. 1) is mounted on output shaft 29 and is rotatable therewith. In addition to driving the speedometer said gear 103 also drives a governor which will be described later.

The control for jaw clutch 74, which controls the shift from second speed to direct drive and back again is shown in Figs. 2 and 4 and comprises an arm 164 which is connected to a rock shaft 165, the latter being provided with a crank arm 166 in which is pivotally mounted a yoke 167 which engages sleeve 67 of clutch 74. A spring 168 normally biases arm 164 in a clockwise direction (Fig. 4) to engage clutch 74 for direct drive. The action of spring 168 is opposed by an electrically controlled vacuum operated device 169 which is shown in Fig. 4. The device is comprised of a rod 170 which is urged by a spring 171 in a direction to oppose spring 168, thus to shift jaw clutch 74 to second speed, spring 171 being stronger than spring 168. The action of spring 171 is in turn opposed by a pressure differential operated diaphragm 172, one side of which is adapted to be connected to a vacuum line 173 through a valve 174. The movement of the valve is in turn controlled by a solenoid 175 in a manner hereinafter to be described. When the rod has once been moved by the pressure differential device it is latched in position by means of a latch 176 which thereafter renders the rod independent of fluctuations of vacuum.

Associated with vacuum unit solenoid 175 is an ignition interrupting switch 223. It is actuated by movement of rod 170 so as to break the circuit to the ignition just prior to the engagement of the rod with direct-second lever 164 and then, as the lever is moved to disengage clutch 74, the ignition circuit is again restored.

The automatic control for the overdrive unit is shown in Fig. 3 and comprises a solenoid 96 provided with a holding coil 208 which when energized pushes pawl rod 97 radially inward by means of an armature 231 and spring 232 acting upon rod 97. A switch 209 is operated by movement of rod 97 to break the circuit through solenoid 96 when pawl 64 is engaged with its slot 93, and a switch 210 is likewise operated by movement of pawl rod 97 to close a conditioning circuit for a downshift.

The shifts above second speed are made automatically but under the control of the operator to produce direct drive at speeds ranging from approximately 12 M. P. H. to 23 M. P. H., overdrive second or overdrive direct at the operator's option at speeds ranging from approximately 23 M. P. H. to approximately 35 M. P. H., and overdrive direct at speeds above 35 M. P. H. It is also contemplated that downshifts will be made automatically under the control of the operator from overdrive direct to direct drive at speeds above 35 M. P. H., and from overdrive direct to overdrive second and immediately thereafter at the option of the operator to second speed at speeds ranging from 35 M. P. H. to 23 M. P. H. and a further downshift from direct to second at speeds ranging from 23 M. P. H. to 12 M. P. H. These combinations of speeds are controlled primarily by the joint action of a speed controlled switch or governor 178 (Fig. 5) and a throttle controlled switch 187 (Figs. 6 to 10).

The governor switch is shown schematically in Fig. 5 and comprises a shaft 177 which is driven from a speedometer drive gear 103 and output shaft 29 so as to be responsive to the speed of the output shaft. Obviously the governor could be driven from some other shaft or part which is movable with the vehicle. Shaft 177 drives one or more weights 177a which are pivoted to the shaft and are adapted to swing outwardly when shaft 177 is rotated. Weights 177a move a rod 179 to which are secured a plurality of switch arms 180, 181 and 182. Said switch arms cooperate with fixed contacts 183, 184, 185 and 186 to effect changes in the electrical circuit to the overdrive solenoid 96 and second and direct speed control solenoid 175 which will produce low speed up to 12 M. P. H., direct drive up to 23 M. P. H., overdrive above 23 M. P. H., downshift to second below 35 M. P. H., and downshift to direct only above 35 M. P. H. respectively.

The throttle switch 187 is shown in Figs. 6 to 10 and comprises a plurality of individual switches operated by a rod 189 which may be pushed inwardly against the action of a spring 190 by the accelerator pedal 191. The contacts are arranged to be operated at three critical positions of the accelerator pedal, namely, (1) substantially closed position, (2) substantially one-half open position and (3) substantially fully opened position. The last named position is the downshift position for both transmission units and the other two positions are conditioning positions for the downshifts.

A direct-second switch is provided which is controlled by the lever 164 for operating direct-second jaw clutch 74. This switch is shown in Fig. 4 at 192 and controls the downshift into second speed from overdrive direct speed. This switch compels a sequence of downshifts from overdrive direct to overdrive second and then to second speed instead of a conventional and less desirable sequence comprising a shift from overdrive direct to direct and then to second speed.

The electrical controls also include various relays which cooperate with the overdrive and second speed-and-direct drive controls and with the governor and other switches to control the operation thereof all as will be hereinafter in detail. These relays may be mentioned here briefly as an overdrive relay, an ignition break relay, a distributor relay, and a delayed action relay.

*The control circuits*

Figure 6:
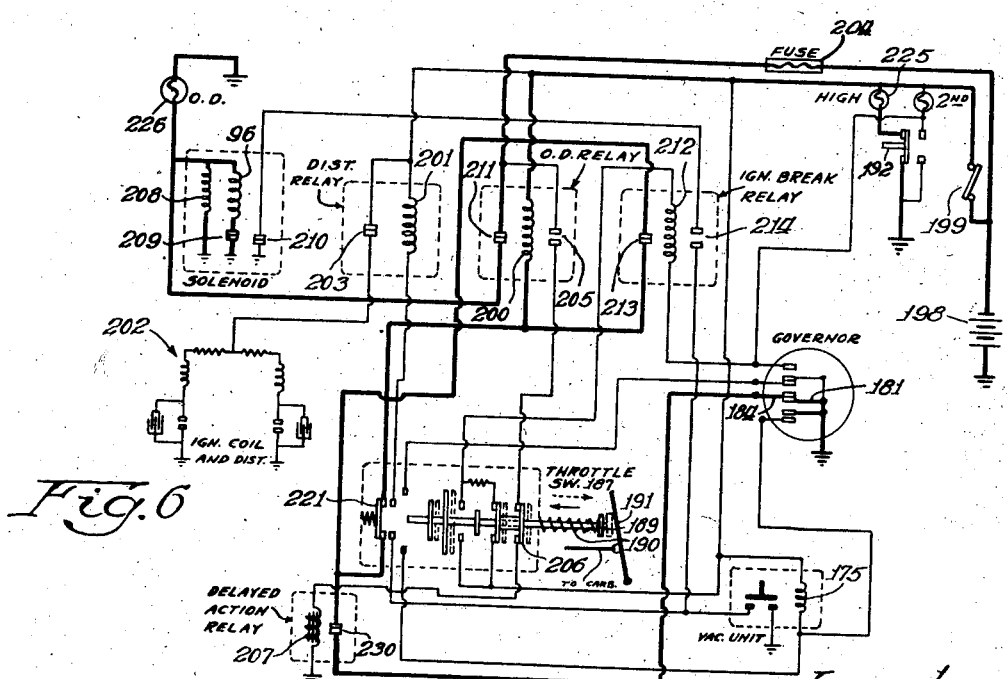

The connections between the electrical elements which cooperate to provide the necessary functions for the transmission are shown in Fig. 6. These comprise, among others, a power circuit from a battery 198 through an ignition switch 199 to solenoid 175 (hereinafter termed "vacuum unit") which it will be remembered controls the shift from second to direct; another power circuit to the overdrive relay 200, a third power circuit to the distributor relay 201, and a fourth power circuit to the ignition system 202 through the normally closed contacts 203 of distributor relay 201. The ignition system illustrated is of the variety used on multiple cylinder engines of the V-type. It is to be understood that the wiring diagrams are applicable equally as well to ignition systems used on other types of engines.

Another power circuit is established from battery 198 through a fuse 204, and normally closed contacts 205 of overdrive relay 200 to the throttle switch 187. Said throttle switch 187 is provided with a switch 206 which when operated completes the power circuit to delayed action relay 207. The direct-second switch 192 is shown schematically in Fig. 6 at the right hand side of the figure. In the upper left hand corner of Fig. 6 are shown the overdrive solenoid 96, holding coil 208, solenoid release switch 209, and ignition break control switch 210. The overdrive relay is provided with a second pair of contacts 211 which control the energization of overdrive solenoid 96. The ignition break relay comprises a coil 212 and two sets of contacts 213 and 214, the contacts 213 controlling one of the paths for the energization of overdrive relay 200 and the other set 214 controlling the ignition break circuit.

The combination of electrical devices shown in Figs. 6 to 10 inclusive is susceptible of a number of functions, depending upon the particular combination of positions of the governor switch and throttle switch extent at any given instant. These functions are described in detail in the aforesaid co-pending Simpson and Carnagua application and hence all will not be repeated here.

This invention is concerned primarily with the downshifting functions and particularly with the downshift from overdrive direct to ovedrive second. Accordingly, only those conditions which are pertinent to such a downshift will be described in detail hereinafter.

*Vehicle moving in direct above 23 M. P. H.*—The condition of the circuit which obtains when the vehicle is traveling above 23 M. P. H. is shown in Fig. 6. It is assumed that the transmission has been shifted to direct drive before a vehicle speed of 23 M. P. H. had been reached. The principal change effected at this critical speed is the automatic completion of a circuit through governor switch arm 181 and its associated contact 184. It will be assumed in connection with Fig. 6 that the throttle switch is not operated to its downshifting position. Initially, however, switch 206 of throttle switch 187 had been operated to complete a circuit as before through the overdrive relay contacts 205 to operate the delayed action relay and open contacts 230. Thus when the governor switch operated to complete the circuit therethrough as aforesaid, the remainder of the circuit remained open because of the opening of contacts 230. With a subsequent release of the throttle switch to the dotted position shown, delayed action relay 207 is deenergized and after a predetermined time delay, contacts 230 are closed. This establishes a circuit through two paths to overdrive relay coil 200 to operate the overdrive relay. One of the paths is through switch 221 directly to the coil 200 and the other path is around switch 221, through contacts 213 of the ignition break relay to coil 200. The energization of overdrive relay coil 200 closed contacts 211 and thereby completed the circuit through solenoid 96 of the overdrive control system to push the pawl 64 into engagement with slotted element 63. This stopped the rotation of sun gear 59 and established overdrive. The movement of pawl 64 into engagement with a slot 93 simultaneously opened contacts 209 to deenergize solenoid 96, and closed contacts 210 to condition the circuit for a subsequent downshift. The pawl is held in engaged position by holding coil 208.

It will be observed that the circuit through the overdrive relay coil 200 was not established until the throttle had been released. Simultaneously with the release of the throttle, intermediate shaft 27 was slowed down and was permitted, by delayed action relay 207, to continue slowing down for the period provided for by the delay in closing contacts 230. The movement of the pawl into engagement with a slot 93 therefore occurred when slotted element 63 was rotating slowly and was possible without further delay when the overdrive relay was energized.

*Vehicle moving between 23 M. P. H. and 35 M. P. H. in high overdrive with the throttle in one-half throttle position.*—It is contemplated that this invention will be used with a transmission wherein two successive downshifts are possible in a speed range of approximately 23 M. P. H. to 35 M. P. H. Fig. 7 shows the condition of the circuit when the vehicle is moving within this range in overdrive direct and the throttle has been moved to one-half throttle position before the first downshift. It will be observed that under these conditions the completion of the circuit through switch 215 has no effect upon the circuit or the operation of the transmission due to the fact that direct-second switch 192 removes ground from ignition break relay coil 212 when the first unit 25 of the transmission is in direct drive.

*Vehicle moving between 23 M. P. H. and 35 M. P. H. in overdrive direct with throttle in first down-shift position.*—Fig. 8 shows the condition of the circuit when the throttle switch 187 has been moved to its downshifting position for the first time after the transmission has been shifted to overdrive direct. In this position the circuit through switches 216 and 217 are completed and the circuit through switch 221 is broken. Previously, switch 221 provided one of two paths to overdrive relay coil 200 and a second circuit was provided for this coil around switch 221 through contacts 213 of ignition break relay coil 212. The breaking of the circuit through switch 221 therefore has no effect on the overdrive relay and the latter remains energized through contacts 213 of the ignition break relay. No change is therefore effected in holding coil 208 of the overdrive solenoid and pawl 64 remains engaged with its slotted member 63 for overdrive operation. The ignition break relay coil 212 remains deenergized as long as direct-second switch 192 remains in the left hand position (Fig. 8).

The completion of the circuit through switch 216 establishes a ground connection for vacuum unit solenoid 175 through contact 185 and switch arm 182 of the governor switch. The completion of the circuit through switch 217 again completes the circuit through distributor relay coil 201 subject to the operation of ignition break switch 223 associated with the vacuum unit. Jaw clutch 74 will therefore be moved to disengage direct drive and permit second speed to become effective.

*Vehicle moving between 23 M. P. H. and 35 M. P. H. in overdrive second after first downshift.*—It will be noted that when the vacuum unit has downshifted clutch 74, direct-second switch 192 is moved to its second speed position which establishes a ground circuit to ignition break relay coil 212.

Figure 9:
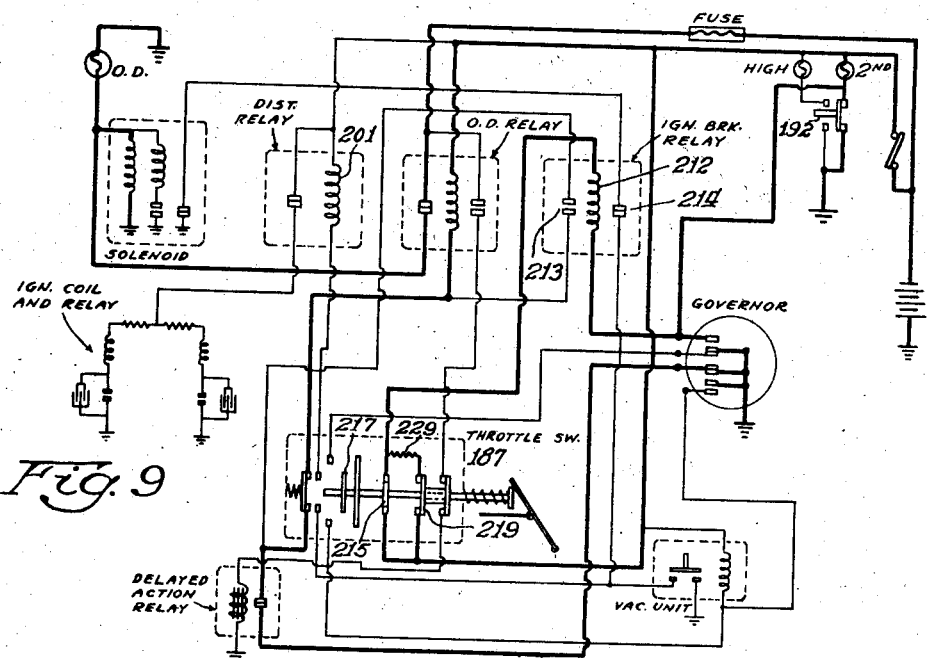

Referring now to Fig. 9, wherein throttle switch 187 is shown in its mid-position after the first downshift, it will be observed that switch 215 is operated to complete a circuit therethrough and that switch 219 has been previously operated when the throttle was moved to partially open position. The circuit through switch 215 applies battery to ignition break relay coil 212 and operates the relay to open contacts 213 and close contacts 214. This breaks the second circuit which had been provided for overdrive relay coil 200 and completes, through contacts 213, a circuit through distributor relay 201 subject, however, to the operation of switch 217. The circuit is now conditioned for a second downshift and although switch 215 may thereafter move to break the circuit therethrough, ignition break relay coil 212 will nevertheless remain energized through resistance 229 and switch 219 which remains operated at all times except when the throttle is in closed position.

Figure 10:
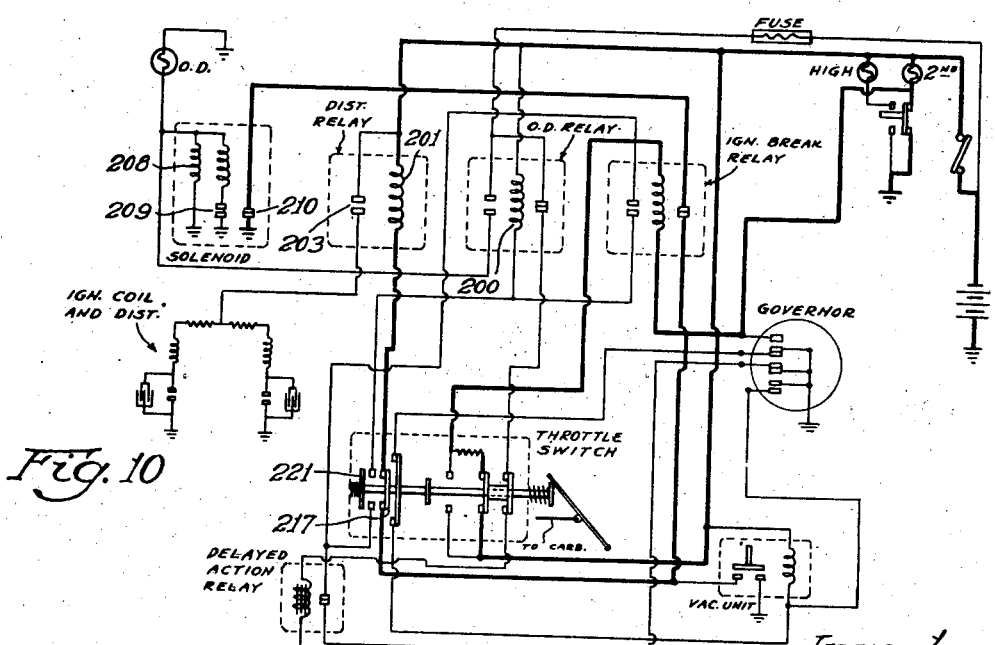

*Vehicle moving between 23 M. P. H. and 35 M. P. H. in overdrive second after first downshift and circuit conditioned for second downshift.*—The condition of the circuit when the throttle switch 187 is moved to its downshifting position a second time after having been moved to one-half throttle position is illustrated in Fig. 10. The first operation effected is the opening of switch 221 which opens the only remaining circuit to overdrive relay coil 200 and therefore deenergizes the relay. This likewise deenergizes holding coil 208 of the solenoid and permits spring 95 to bias the pawl 64 to disengaged position. The pawl will not move, however, until there is an interruption of torque. The interruption is accomplished by the immediately following completion of the circuit through switch 217 to distributor relay coil 201 which then becomes energized and opens contacts 203, thereby opening the ignition circuit. The movement of pawl 64 radially outward to disengaged position closes contacts 209 and opens contacts 210 to deenergize distributor relay coil 201, thereby reestablishing the ignition circuit and permitting forward movement of the vehicle in second speed.

Although the control circuits have been described with reference to a transmission of the type comprising a countershaft unit combined with a planetary overdrive unit, they may be applied with equal facility to two underdrive units or to two overdrive units, whether both are planetaries or countershaft units. They may also be applied to two or more units of any other variety such as hydraulic torque converters having a lockup mechanism and to such converters combined with either a countershaft unit or a planetary unit, the units being either overdrives or underdrives. It is understood that the governor switch may be designed to effect changes in function at speeds other than those specified and that the description as a whole is merely illustrative of a preferred embodiment of the invention, the scope of the invention being determined by the appended claims.

I claim:

1. A variable speed transmission comprising in combination a countershaft type unit having low, second and direct drive ratios, and a planetary type unit having direct drive and overdrive ratios, automatically controlled means for effecting shifts between second and direct drive in the countershaft unit and between direct drive and overdrive in the planetary unit, said means being adapted to effect up shifts from second to direct to overdrive direct, and manually operated overcontrol means for effecting down-shifts from overdrive direct to overdrive second to second.

2. A variable speed transmission comprising in combination a countershaft type unit having low, second and direct drive ratios, and a planetary type unit having direct drive and overdrive ratios, automatically controlled means for effecting shifts between second and direct drive in the countershaft unit and between direct drive and overdrive in the planetary unit, said means being adapted to effect upshifts from second to direct to overdrive direct, manually operated overcontrol means for effecting down-shifts from overdrive direct to overdrive second to second, and means for limiting said down-shifts above a predetermined speed of operation of one of the units from overdrive direct to direct only.

3. A variable speed transmission having first and second movable elements for effecting speed ratio changes through the transmission, electromagnetic means for controlling the elements, and means for controlling the electromagnetic means, said controlling means for the electromagnetic means including a manually operable switch having a plurality of sets of contacts, two sets of which are substantially simultaneously operable at the limit of movement of the switch in one direction, said two sets controlling the movements of the two elements for effecting downward changes of speed, and a switch controlled by movement of the first element for preventing the switch controlling the downward changes of speed of the second element from becoming effective until the first element has been moved to effect a downward change of speed.

4. A variable speed transmission as described in claim 3, a third set of contacts operable at a point intermediate the limit of movement of the first-mentioned switch in either direction, and effective after the first element has been moved to effect a downward change of speed, to condition the electromagnetic means for moving the second element to effect a downward change of speed upon a second movement of the first-mentioned switch to its limiting position in said one direction.

5. A variable speed transmission as described in claim 3, a third set of contacts operable at a point intermediate the limit of movement of the first-mentioned switch in either direction, and a relay controlling the effectiveness of the electromagnetic means to move the second element to effect a downward change in speed, the circuit through the relay being partially made by the third set of contacts and completed by the switch controlled by movement of the first element when the first element has been moved to effect a downward change in speed.

6. A variable speed transmission as described in claim 3, a third set of contacts operable at a point intermediate the limit of movement of the first-mentioned switch in either direction, a relay controlling the effectiveness of the electromagnetic means to move the second element to effect a downward change in speed, the circuit through the relay being partially made by the third set of contacts and completed by the switch controlled by movement of the first element when the first element has been moved, and means for holding the relay operated irrespective of subsequent movement of the first-mentioned switch in said one direction to break the third set of contacts, said holding means being releasable upon movement of the first-mentioned switch to the limit of its movement in the opposite direction.

7. A variable speed transmission having first and second movable elements for effecting speed ratio changes through the transmission, a solenoid for controlling a movement of the second element, a relay for controlling the solenoid, said relay when deenergized likewise deenergizing the solenoid, a switch providing one path for energizing the relay, a second relay having contacts which when the second relay is deenergized provide a second path for energizing the solenoid relay, manual means for opening the switch to remove one path, a switch operated by a movement of the first element to condition the second relay for operation, and a switch, operated by the manual means prior to its opening the first path switch, for energizing the second relay to remove the second path, thereby deenergizing the relay and solenoid to effect a movement of the second element.

8. A variable speed transmission as described in claim 7, said switch operated by the first element being operable upon a down-shift of the first element to effect a downward change in speed and said solenoid when deenergized controlling the movement of the second element to effect a downward change in speed.

9. A variable speed transmission having first and second movable elements for effecting speed ratio changes through the transmission, electromagnetic means for controlling the elements, and means for controlling the electromagnetic means, said controlling means for the electromagnetic means including a manually controlled switch and a speed controlled switch having a plurality of sets of contacts, one set controlling the first element, the second controlling the second element, and the third set controlling the first element in conjunction with the manually controlled switch within a predetermined range of speeds to effect a downward change in speed, and above a predetermined speed to prevent a downward change in speed by the first element and to permit a downward change in speed by the second element, said last mentioned means also including a switch operated by movement of the first element which prevents a downward change in speed by the second element until the first element has effected a downward change in speed.

10. A variable speed transmission having first and second movable elements for effecting speed ratio changes through the transmission, electromagnetic means for controlling the elements, and means for controlling the electromagnetic means, said controlling means for the electromagnetic means including a manually controlled switch and a speed controlled switch having a plurality of sets of contacts, one set controlling the first element, the second controlling the second element, and the third set controlling the first element in conjunction with the manually controlled switch within a predetermined range of speeds to effect a downward change in speed, and above a predetermined speed to prevent a downward change in speed by the first element and to permit a downward change in speed by the second element, said last mentioned means including a switch operated by movement of the first element which prevents a downward change in speed by the second element until the first element has effected a downward change in speed, and means operated by release of the manually controlled switch after the first element has effected a downward change in speed to condition the second element for a downward change in speed.

11. A variable speed transmission having first and second movable elements for effecting speed ratio changes through the transmission, electromagnetic means for controlling the elements, and means for controlling the electromagnetic means, said controlling means for the electromagnetic means including a switch operated by movement of the first element for preventing a downward change in speed by the second element until the first element has made a downward change in speed, and a speed controlled switch for overruling the first mentioned switch.

12. A variable speed transmission having first and second movable elements each for effecting in a drive in one direction through the transmission a change from one speed ratio to another speed ratio, electromagnetic means for controlling the elements, and means for controlling the electromagnetic means, said controlling means for the electromagnetic means including a switch operated by movement of the first element for controlling the movement of the second element.

13. A variable speed transmission having first and second movable elements each for effecting a change from one speed ratio to another speed ratio through the transmission, electromagnetic means for controlling the elements, and means for controlling the electromagnetic means, said controlling means for the electromagnetic means including a switch operated by movement of the first element for controlling the movement of the second element to effect a downward change in speed, and a speed controlled switch for overruling the first-mentioned switch.

CARL W. OSBORNE.

Disclaimer 2,328,291.—*Carl W. Osborne*, Muncie, Ind. AUTOMATIC TRANSMISSION. Patent dated Aug. 31, 1943. Disclaimer filed Nov. 4. 1948, by the assignee, *Borg-Warner Corporation*.

Hereby enters this disclaimer to claims 1 and 2 in said specification.

[*Official Gazette December 14, 1948.*]